May 28, 1940.   O. SIEBLER ET AL   2,202,436
SPRINGING ARRANGEMENT
Original Filed Aug. 25, 1936
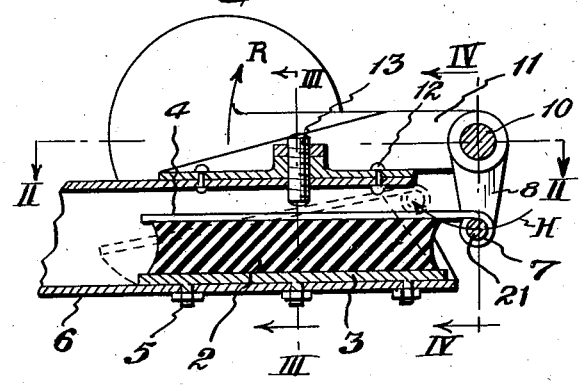
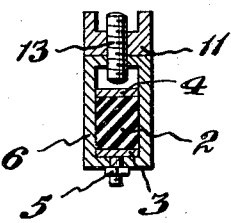
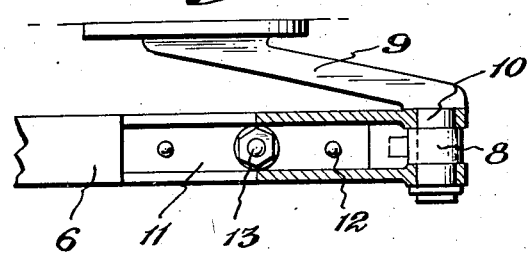
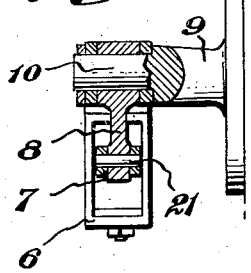
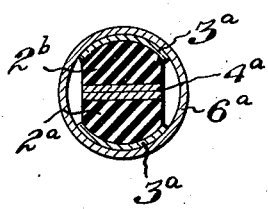
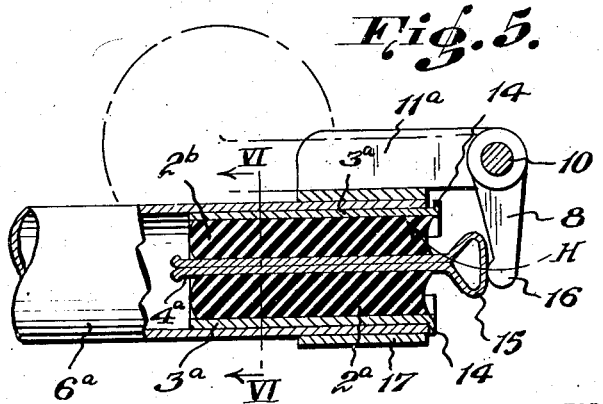
INVENTORS,
O. Siebler and W. Boxan
BY Glascock Downing Seebold
ATTORNEYS.

Patented May 28, 1940

2,202,436

UNITED STATES PATENT OFFICE 2,202,436

SPRINGING ARRANGEMENT

Oscar Siebler, Zwickau, and Walter Boxan, Zschopau, Germany, assignors to Auto Union Aktiengesellschaft, Chemnitz, Germany Original application August 25, 1936, Serial No. 97,856. Divided and this application March 23, 1938, Serial No. 197,736. In Germany August 28, 1935

5 Claims. (Cl. 267—21)

The invention relates to a springing arrangement, more particularly for automobiles with swinging link members carrying the wheels and using rubber members stressed in shear. The present application is a division of our co-pending application Serial No. 97,856, filed August 25, 1936.

Such rubber members have hitherto been made in the form of sleeves extending in the direction of the link member journals and distorted by a rotary movement. In these constructions the material is not uniformly utilized, because the inner and outer shear surfaces are of different sizes. The transmission ratio between the power and the load is predetermined and fixed by the length of the link member. The link member journal passing through the rubber sleeve must be of considerable length and must have two bearings, which involves considerable expense. Also such rubber sleeves are difficult to manufacture and fix.

In contradistinction thereto the novelty of the invention consists in this, that the rubber members are constructed in the form of prisms extending in the mean direction of movement of the link member. The rubber members in this case are deformed by a movement which takes place in the axis of the prisms. The material can, in this case, be uniformly utilized because all the shear surfaces are equal. Fundamentally, any ratio of transmission between the power and the load is possible, so that very hard rubber materials can be used. Such rubber members are simply made and easily fixed. The constructional expense for mounting them is only small, on account of the prismatic shape. According to the invention the rubber members are provided with adhering plates, which are releasably connected at one side with the frame and at the other side with the link member. In this way it is made possible easily to insert and remove the rubber members without damage.

Rubber members of prismatic form are already known, for example for engines and gears of automobiles. In these constructions however, the rubber members serve only for providing a vibrationless mounting or for damping the oscillations. They must, as a rule, be so greatly stressed that their springing properties remain small.

Several constructional examples of the invention are illustrated in the accompanying drawing.

Fig. 1 is a vertical principal section through the first spring arrangement.

Figs. 2-4 are corresponding sections along the lines II—II, III—III and IV—IV in Fig. 1.

Fig. 5 is a vertical principal section through another spring arrangement.

Fig. 6 is a sectional view taken on the line VI—VI of Fig. 5.

In the constructional example according to Figs. 1-4 the rubber body 2 is made prismatic and is connected with two plates 3, 4, so as to adhere firmly. The lower plate 3 is secured by means of screw bolts 5 to the lower web of the box-like longitudinal frame member 6. The upper plate 4 is constructed as a spring plate and is pivoted by means of a spring eye 7 to the short arm 8 of the wheel link member 9. The link member 9 is guided by means of a journal 10 in a bracket 11 secured by means of rivets 12 to the upper web of the longitudinal frame member 6. In the bracket 11 is mounted an adjustable screw bolt 13, which strikes against the plate 4 in such a manner that this tilts inwardly when the link member arm 8 swings. The rubber member 2 is enclosed in the rear end of the frame member 6.

If the wheel swings upwardly in the direction R, the plate 4 is moved forwardly by the arm 8 in the direction H. Since the spring eye 7 also moves upwardly relative to the frame member 6, the plate 4 is simultaneously turned about the screw bolt 13. In addition to the shear stress in the direction H of the movement of the arm 8, there are also tension and compression stresses in the vertical direction. This causes the springing to be harder the greater is the wheel deflection, so that a progressive springing characteristic is obtained. The amount of progressiveness can be varied within any desired limits by adjusting the point 13 and in this way the running requirements can be met. Also the natural damping of the springing arrangement can be influenced by giving the rubber member 2 a certain initial tension in the direction perpendicular to the direction H.

In the constructional example according to Figs. 5 and 6, the plates 3a are adapted to the arcuate form of a tubular longitudinal frame member 6a. The plate 4 of Fig. 1 in this modification consists of a folded leaf-spring 4a, the fold 15 of which forms a rolling track for the link member arm 8. The hook-like abutments 14 of the plate 3a are mutually offset so that they strike against the end of the frame successively. The bracket 11a is secured to the end of the frame tube 6a by means of a clip 17. When the link member arm 8 swings in the direction H the rounded end 16 slides along the rolling track 15 and first the lower rubber member 2a and subsequently both rubber members 2a and 2b are deformed. Since at the same time the effective length of the lever arm 8 diminishes a progressive springing is obtained. A frictional force applied to the rolling track 15 cannot produce a noticeable tilting of the plates 4a.

The prismatic rubber members can also have other shapes, which are determined by the construction of the longitudinal frame member and of the link member. The essential feature of the invention is that the longitudinal axis of the prismatic rubber member approximately coincides with the direction of movement of the engaging arm of the link member. The length of the engaging link member arm is immaterial for the invention.

We claim:

1. A springing arrangement for a wheel of a vehicle including a frame, a bracket mounted on the frame, a wheel carrying link member journaled in the bracket and having an arm, a plate-like member extending along said frame and having an enlargement adjacent the free end of said arm, a rubber member attached to a face of said plate-like member and another surface of the rubber member being adapted to be held by said frame, whereby the free end of the arm slidably engages said enlargement and the shear resistance of the rubber member between the plate-like member and the frame opposes the springing of the wheel carrying link member.

2. A springing arrangement for a wheel of a vehicle including a frame, a bracket mounted on the frame, a wheel carrying link member journaled in said bracket, an arm fixed to said link member, a plate-like member extending into said frame and having an enlargement adjacent the free end of said arm, a rubber member attached to each of two surfaces of said plate-like member, a plate attached to the outer surface of each rubber member, and staggered abutments carried by the plates adapted to successively engage the frame and prevent movement of the outer portions of the rubber members with respect to the frame, whereby the shear resistance of one rubber member first opposes the springing of the wheel carrying link member and upon further movement of the plate-like member in response to the engagement of said arm the shear resistance of the second rubber member assists the first rubber member in opposing the springing of the wheel.

3. A springing arrangement for a wheel of a vehicle including a frame having a tubular shaped end, a bracket mounted on the frame adjacent the tubular end thereof, a wheel carrying link member journaled on said bracket, an arm rigidly fixed to said link member, a plate-like member extending into the end of said frame and having an enlargement adjacent the free end of said arm, a rubber member secured to each of the flat surfaces of said plate-like member, an arcuate shaped plate attached to the outer portion of each rubber member and each of said arcuate shaped plates being adapted to be guided within said tubular frame, and staggered abutments carried by said arcuate shaped plates adapted to successively engage the end of the frame and prevent movement of the outer portions of the rubber members with respect to the frame, whereby inward movement of the plate-like member in response to the arm engaging said enlargement is opposed successively by the shear resistance of the two rubber members.

4. A springing arrangement for a wheel of a vehicle including a frame, a bracket mounted on the frame, a wheel carrying link member journaled in the bracket, an arm fixed to said link member, a plate-like member consisting of a folded leaf-spring extending along the frame, said plate-like member having a fold portion adjacent the free end of said arm providing a rolling track adapted to be engaged by the arm, a rubber member attached to the flat surfaces of said plate-like member, a plate secured to each opposite surface of said rubber members, and means carried by said last mentioned plates adapted to successively engage the frame and prevent movement of the outer portions of the rubber members with respect to the frame, whereby the shear resistance of one rubber member first opposes the springing of the wheel and thereafter the shear resistance of the second rubber member provides additional opposition to the springing of the wheel.

5. A springing arrangement for the wheel of a vehicle including a frame having a tubular shaped end, a bracket and a clip surrounding the tubular portion of the frame supporting the bracket adjacent the end of the frame, a wheel carrying link member journaled in said bracket and an arm rigidly fixed to said link member, a plate-like member extending into the end of the frame and having an arcuate shaped enlargement adjacent the free end of said arm, a rubber member adhering to each of two surfaces of said plate-like member, an arcuate shaped plate attached to the outer surface of each rubber member, and each arcuate shaped plate having an offset portion spaced at different intervals from the end of said frame adapted to successively engage the end of the frame and prevent movement of the outer portion of the rubber members with respect to the frame.

OSCAR SIEBLER.
WALTER BOXAN.